Patented Aug. 6, 1935

2,010,123

UNITED STATES PATENT OFFICE 2,010,123

SYNTHETIC VARNISH COMPOSITION

John C. Woodruff, Terre Haute, Ind., assignor, by mesne assignments, to Resinox Corporation, New York, N. Y., a corporation of New York No Drawing. Application May 11, 1931, Serial No. 536,693

2 Claims. (Cl. 134—26)

The present invention relates to improvements in synthetic resin compositions. More particularly it relates to resinous compositions of improved properties which are especially valuable in varnishes.

Attempts have been made in the past to prepare varnishes from synthetic resins such as the phenol-aldhyde type by incorporating such resins in suitable solvents. Such solutions are used either for coating surfaces, as of furniture and floors, or for impregnating materials like absorbent paper for the purpose of preparing punch stock. In the latter case a laminated product is prepared from the impregnated paper by curing under pressure at an elevated temperature. The product should be flexible and capable of being cut or having holes punched in it without cracking, checking, or otherwise becoming defective and unsightly. Ordinarily, however, these defects will be encountered and render the article unsuited for many purposes. Difficulties of a similar nature will also be encountered where the resins are used for coatings or for molded articles.

It has now been discovered that by incorporating neutral phosphoric esters of aliphatic alcohols with resins of the type above referred to or in solutions of such resins designed to be used as varnishes, the difficulties just enumerated are entirely overcome. The films, laminated products, molded articles, and the like, thereby obtained possess a sufficient degree of pliability so that they are suitable for many purposes for which the resin alone is quite unsatisfactory.

While trialkyl phosphates in general may be employed as a softening or plasticizing agent for synthetic resin compositions it is obvious that the higher boiling materials will give generally better results than the lower boiling materials due to the fact that during the processing and ageing of the final product appreciable amounts of the lower boiling esters will naturally be evaporated from the article which thereupon loses some of the desirable properties attained by the incorporation of the esters. It is preferable, therefore, to use esters such as tributyl or triamyl phopshates in place of lower boiling esters such as trimethyl or triethyl phosphates. It is understood, of course, that other esters of similar boiling range may be used with satisfactory results. Examples of such materials are the neutral phosphoric esters of isobutyl alcohols, secondary alcohol, isoamyl alcohol, secondary amyl alcohol, normal propyl alcohol, etc.

The neutral phosphoric esters may be obtained in a number of ways, as for example, by either of the methods outlined below:

Example I

The vapors of 154 parts of phosphorus oxychloride, under an absolute pressure of 25-45 mm. of mercury, are passed in the course of 30 minutes into 400 parts of n-butyl alcohol at about 50° C., contained in a vessel provided with a reflux condenser. The mixture is then kept boiling for from about 30-60 minutes longer and, subsequently, the remainder of the butyl alcohol is distilled off. The tributyl phosphate is then recovered by distillation under a good vacuum.

Example II

A preferred method of preparing neutral phosphoric esters consists of reacting phosphorus oxychloride with an aluminium alkoxide. This reaction is preferably carried out by slowly adding a hydrocarbon (e. g. benzol) solution of phosphorus oxychloride to a hydrocarbon (e. g. benzol) solution of aluminium alkoxide (butoxide) while maintaining the temperature of the reaction mixture below about 15° C., then slowly adding sufficient water to hydrolyze any aluminium chloride and phosphorus oxychloride present while regulating the temperature of the reaction mixture.

Pure tri-n-butyl phosphate obtained as above described boils at approximately 135° C. under a pressure of 5 mm. of mercury. The tri-isobutyl phosphate boils at approximately 112° C. under a pressure of 4-5 mm. of mercury. Tri-amyl phosphate boils at 143-44° C. under a pressure of 2.5 mm. of mercury.

As has been previously indicated the phosphoric esters of aliphatic alcohols are particularly well suited for use with synthetic resins such as phenol-aldehyde, urea-formaldehyde, etc. in the preparation of molded products, varnishes, etc. The esters in question are compatible with resins and soluble in the usual solvents such as alcohol, acetone, benzol, etc., used in the production of resinous varnishes. In preparing a varnish generally 20-40 parts of a phosphoric ester, as for example, tri-n-butyl phosphate, to 100 parts by weight of a resin of the heat-hardening type such as phenol-formaldehyde resin may be incorporated in a suitable solvent or solvent mixture of the usual type, as for example, methyl or ethyl alcohol, acetone, methyl ethyl ketone, ethyl acetate, benzol, etc. Generally about 20 parts by weight of solvent to 80 parts by weight of ester-resin mixture will give a satisfactory resin of suitable consistency. It is, of course, possible to vary considerably the proportions set forth above without departing from the scope of the present invention.

Varnishes of the type hereinabove disclosed may be applied by the usual means directly to wood, metal, cloth, etc., and are particularly well suited to the production of laminated sheets and similar articles, the sheets thereby obtained being flexible and at the same time tough and resistant to deformation except where excessive quantities of the ester have been employed.

After applying the varnish, the coated material is allowed to dry at ordinary drying temperatures, say approximately 80° C., until the solvents and any moisture present have been evaporated. This temperature and the time of drying may, of course, be varied considerably depending upon the general operating conditions and the character of product desired. The temperature is next preferably raised for a time to 125-175° C. so as to convert the resin into the infusible and unreactive form. It is customary in the case of laminated and molded products also to subject the article being heated to pressures in the neighborhood of 2000 pounds per square inch. This, however, may also be varied considerably depending upon the particular conditions under which it is desired to work and the article to be produced.

If desired, the phosphoric esters hereinabove referred to, may be incorporated with the resin without the aid of solvents. The product thus obtained may be subjected to heat and pressure as previously indicated to form molded products and the like.

What is claimed is:

1. A composition of matter having the property of forming homogeneous flexible films when applied to a surface in the form of a thin coating comprising a lower trialkyl phosphate, a synthetic resin of the heat-hardening phenol-aldehyde type which is compatible with said phosphate, and a volatile solvent for said phosphate and resin.

2. A composition of matter having the property of forming homogeneous flexible films when applied to a surface in the form of a thin coating comprising tributyl phosphate, a synthetic resin of the heat-hardening phenol-aldehyde type which is compatible with said tributyl phosphate, and a volatile solvent for said tributyl phosphate and resin.

JOHN C. WOODRUFF.